R. S. BRYANT.
VEHICLE WHEEL WITH DEMOUNTABLE RIM.
APPLICATION FILED APR. 8, 1915.
1,153,482.
Patented Sept. 14, 1915.
2 SHEETS—SHEET 1.
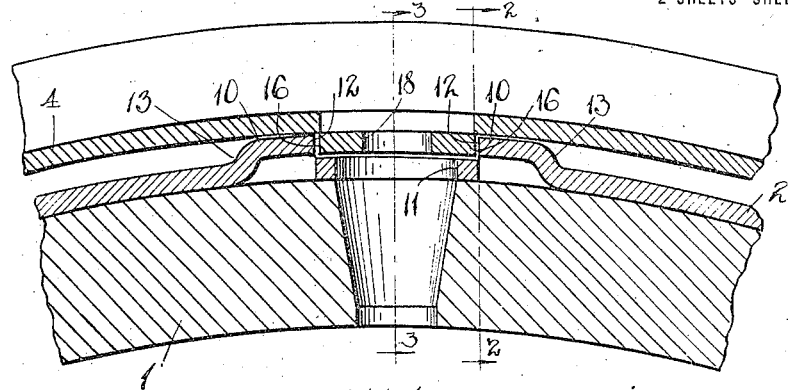
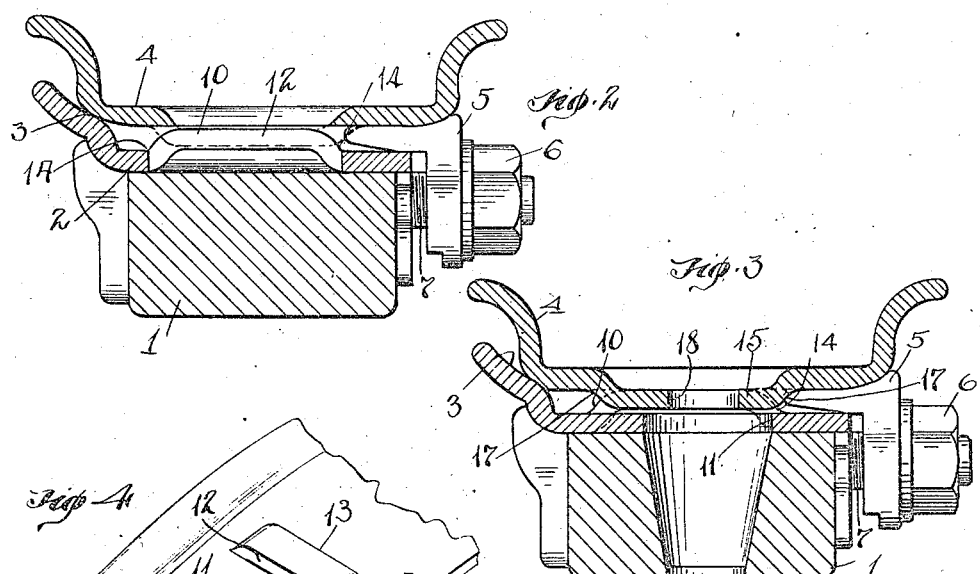

R. S. BRYANT.
VEHICLE WHEEL WITH DEMOUNTABLE RIM.
APPLICATION FILED APR. 8, 1915.
1,153,482.
Patented Sept. 14, 1915.
2 SHEETS—SHEET 2.
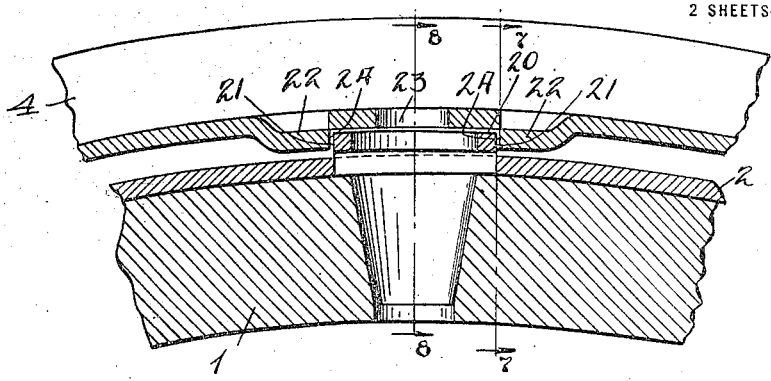
Fig. 6.
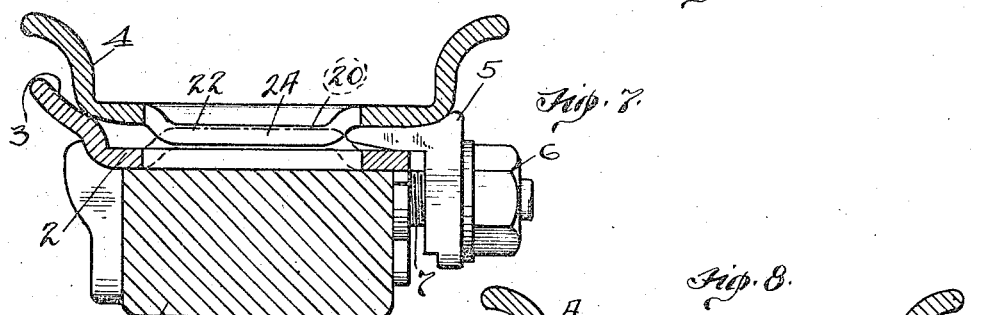
Fig. 7.
Fig. 8.
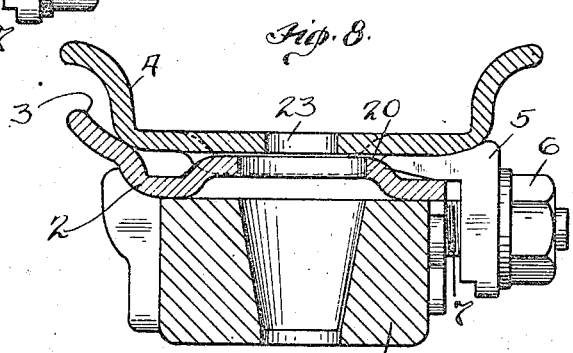
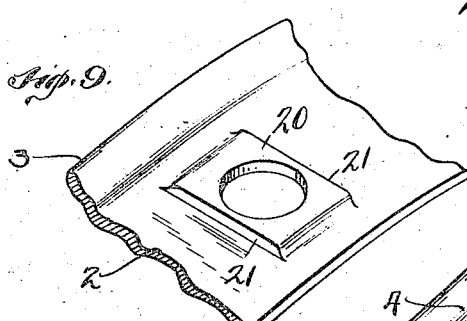
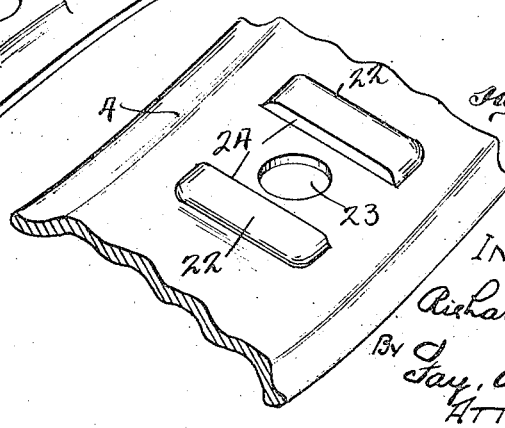
WITNESSES:
O. M. Kappler
Thos. H. Fay
INVENTOR
Richard S. Bryant
By Fay, Oberlin & Fay
ATTORNEYS

UNITED STATES PATENT OFFICE.

RICHARD S. BRYANT, OF CLEVELAND, OHIO, ASSIGNOR TO THE STANDARD WELDING COMPANY, OF CLEVELAND, OHIO, A CORPORATION OF OHIO.

VEHICLE-WHEEL WITH DEMOUNTABLE RIM.

1,153,482.

Specification of Letters Patent. Patented Sept. 14, 1915.

Application filed April 8, 1915. Serial No. 19,922.

*To all whom it may concern:*

Be it known that I, RICHARD S. BRYANT, a citizen of the United States, and a resident of Cleveland, county of Cuyahoga, and State of Ohio, have invented a new and useful Improvement in Vehicle-Wheels with Demountable Rims, of which the following is a specification, the principle of the invention being herein explained and the best mode in which I have contemplated applying that principle, so as to distinguish it from other inventions.

The present improvements relating, as indicated, to vehicle wheels with demountable rims, have regard more particularly to the driving connection provided between the rim and the wheel body, whereby the former is secured against circumferential movement on the latter, as it is essential in order to prevent the valve stem from being broken, as well as desirable for other reasons. The wedging or clamping means, of one kind or another, which are regularly used to secure the rim laterally in place on the wheel body, cannot, of course, be relied on to prevent this circumferential movement, and it has accordingly been the practice to rivet or weld a transverse plate on the inner face of the rim, and similarly to rivet or weld two circumferentially spaced plates on the outer face of the felly-band, the distance between such last-named plates being just sufficient to accommodate the plate on the rim. Usually, moreover, the valve stem aperture in the rim passes through the attached plate, and the aperture in the felly, designed to register therewith, is hence located between the two plates on such felly-band. Thus, these driving plates serve at the same time to non-rotatably secure the rim to the felly-band, and to assist in securing proper registration of these apertures.

The object of the present invention is to avoid the necessity of welding separate plates either on the felly-band or on the rim, for use in the aforesaid connection, by embossing instead lugs of proper form and disposition to serve this purpose, it being remembered that a considerable strain may be imposed upon such lugs.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings: Figure 1 is a longitudinal section on a median line, of a wheel felly and felly-band, with a tire-supporting rim shown mounted thereon, such section being taken through the driving connection between the rim and felly-band, and so illustrating the improved construction of the same; Fig. 2 is a transverse section of the foregoing, taken on the plane indicated by the line 2—2, Fig. 1; Fig. 3 is a similar transverse section, taken on the plane indicated by the line 3—3, Fig. 1; Fig. 4 is a perspective view of a section of the felly-band by itself; Fig. 5 is a similar perspective view of the inside of the complementary section of the tire-supporting rim; Fig. 6 is a longitudinal section, similar to that of Fig. 1, but showing a modified construction of the aforesaid driving connection; Figs. 7 and 8 are transverse sections being respectively taken on planes indicated by the lines 7—7 and 8—8, Fig. 6; and Figs. 9 and 10 are perspective views of a section of the felly-band, and of the complementary section of the rim which enter into such modified construction.

Of the wheel body, only the felly 1 with the usual encircling felly-band 2, is illustrated in the foregoing drawings, such band having on its one side a beveled flange 3 adapted to receive the corresponding edge of the tire-supporting rim 4. The latter is illustrated as designed for the reception of a straight-sided tire, it being a matter of indifference, of course, so far as the driving connection is concerned, whether the rim be thus a straight-sided rim, or provided with clencher flanges, or otherwise modified in construction to adapt it to receive the tire. Such rim is secured in place sidewise on the felly-band by the use of one or more suitable wedge members 5, (a plurality of these being intended to be used in the construction illustrated), which are forced between the band and the outer edge of the rim by means of clamp-nuts 6 threaded on bolts 7, that extend transversely of the felly, as will be readily understood. These wedges 5, however, as previously explained, cannot be relied upon to retain the rim against the tendency to rotate around the wheel body, under driving conditions, and it is for this reason that the circumferentially interlocking driving plates are provided on the inner face of such rim and the outer face of the felly-band. Since it is necessary to guard against circumferential movement in both directions, two plates require to be thus provided on the one member, between which the plate on the other may be inserted, it being a matter of choice whether the two plates be on the outer face of the felly band, and the single plate on the inner face of the rim, or vice versa, although the prevailing arrangement heretofore, has been the former. Instead, however, of riveting or welding these plates on the felly-band and rim, respectively, I depress, stamp or emboss the metal of these members, in the fashion which will now be particularly described, so as to provide integral projections in lieu of such separate plates.

Referring first of all to where the pair of lugs 10, 10 is provided on the felly-band 2, see Figs. 1 to 5 inclusive, each of the embossing dies, whereby these lugs are respectively formed, is constructed to cut entirely through the band on the transverse edge of the lug nearest the valve stem aperture, or hole 11, and the metal displaced or forced radially outward in amount approximately equal to the thickness of the band, thereby providing an abrupt engaging face, or shoulder 12, which is adapted to engage with the opposed face of the driving plate on the rim, when the latter is mounted on the felly-band. The die, however, does not cut the metal along the other edge 13 of the section thus embossed to form such lug 10, but simply deforms it, and similarly simply deforms or stretches the metal along the two ends 14 of the lug, so that such lug remains integrally attached to the rim along all three of such last-named edges.

The complementary lug 15 on the rim 4, I similarly form by embossing the metal of such rim, as best shown in Figs. 1 and 5, the embossing die, whereby such lug is formed, being constructed to cut entirely through the rim on each of the transverse edges of the lug, and the metal displaced or forced radially inward a distance approximately equal to the thickness of the rim. Thus two oppositely directed faces 16 are provided for engaging the shoulders 12 of the two lugs 10 on the band as just described. The dies, however, do not cut the metal along either side 17 of the section of the rim thus embossed, but simply deforms or stretches the same as in the case of the uncut ends 14 of such first-described lugs. The valve stem aperture 18, which can be punched in the rim at the same time that this lug is thus embossed, will be preferably located centrally in the space defined by the lug, as illustrated in the drawings.

The construction illustrated in Figs. 6 to 10 inclusive, of the drawings, is in effect the reverse of that just described. In other words, a single lug 20 is stamped up from the felly-band 2 so as to project radially outward therefrom, but otherwise corresponding in form and function with the radially inwardly stamped lug 15 on the rim 4 in the first described construction, having oppositely disposed faces 21, and including the valve stem receiving aperture of said band. The rim is then provided with two radially inwardly projecting lugs 22, 22 by embossing the metal of such rim on opposite sides of the corresponding valve-stem apertures 23, so as to form lugs substantially identical with the ones, 10, 10, described as being formed in the band in the first construction. These lugs have abrupt engaging faces, or shoulders, 24 adapted to engage with the opposite faces of the single driving lug 20 on the rim, just the reverse of the condition in such first construction.

The driving strain received on the abrupt edges of the paired lugs, whether the latter be stamped up from the felly-band or rim, it will be seen is taken up by the body of the band or rim, as the case may be, and any tendency of the lug to turn up under such strain is prevented by the manner in which its sides are tied to the band. Accordingly, these lugs are even stronger than the separate plates, such as have heretofore been attached to the face of the rim or band, unless such plates are made of considerable size, and strongly welded or riveted fast. The same remark applies to the integrally stamped up, intermediate lug, whether formed on the felly-band or rim, since the lateral edges thereof, very firmly tie the same to such rim or band. At the same time, all the foregoing lugs being directly formed out of the material of the band or rim, not only economize the metal, but permit of much more rapid and economical manufacture than where separate plates require to be located, and then welded or riveted in place, as needs no further explanation.

Unless specially designated as a felly-band, the term "band" as used in the following claims, should be understood to denote either such felly-band, or the demountable rim, in view of the possibility of reversely arranging the lugs constituting the driving connection between the same, as hereinbefore described in detail.

Other modes of applying the principle of my invention may be employed instead of the one explained, change being made as regards the mechanism herein disclosed; provided the means stated by any of the following claims or the equivalent of such stated means be employed.

I therefore particularly point out and distinctly claim as my invention:—

1. As an article of manufacture, a demountable rim for a vehicle wheel, said rim being provided with a radially inwardly projecting driving lug, stamped from and integral with the material of said rim, said lug having a transverse edge severed from said rim so as to form an abrupt shoulder, substantially as described.

2. As an article of manufacture, a demountable rim for a vehicle wheel, said rim being provided with a radially inwardly projecting driving lug, stamped from and integral with the material of said rim, said lug having both transverse edges severed from said rim so as to form oppositely facing abrupt shoulders, and remaining attached to said rim along its other edges, substantially as described.

3. In a vehicle wheel, the combination with the wheel felly and the felly-band thereon; of a demountable rim adapted to be fitted around said felly-band, one of said members being provided with a driving lug on its juxtaposed face, stamped from and integral with the material of said member, and the other member being provided with two circumferentially spaced driving lugs adapted to interlock with said first lug, said two lugs being stamped from and integral with the material of said member, substantially as described.

4. In a vehicle wheel, the combination with the wheel felly and the felly-band thereon; of a demountable rim adapted to be fitted around said felly-band, one of said members being provided with a driving lug on its juxtaposed face, stamped from and integral with the material of said member, said lug having both transverse edges severed from said member so as to form oppositely facing abrupt shoulders, and the other member being provided with two circumferentially spaced driving lugs adapted to interlock with said first lug, said two lugs being stamped from and integral with the material of said member and being severed from said member along their juxtaposed edges so as to form abrupt shoulders, substantially as described.

5. In a vehicle wheel, the combination with the wheel felly and the felly-band thereon; of a demountable rim adapted to be fitted around said felly-band, said rim being provided with a radially inwardly projecting driving lug stamped from and integral with the material of said rim, and said felly-band being provided with two circumferentially radially outwardly projecting lugs adapted to interlock with said first lug, said two lugs being stamped from and integral with the material of said band, substantially as described.

6. In a vehicle wheel, the combination with the wheel felly and the felly-band thereon; of a demountable rim adapted to be fitted around said felly-band, said rim being provided with a radially inwardly projecting driving lug stamped from and integral with the material of said rim, said lug having both transverse edges severed from said rim so as to form oppositely facing abrupt shoulders, and said felly-band being provided with two circumferentially spaced radially outwardly projecting lugs adapted to interlock with said first lug, said two lugs being stamped from and integral with the material of said band and being severed from said band along their juxtaposed edges so as to form abrupt shoulders, substantially as described.

Signed by me, this 5th day of April, 1915.

RICHARD S. BRYANT.

Attested by:
R. C. COOLEY,
VELENA WILLIAMS.